United States Patent
Frensemeier et al.

(10) Patent No.: US 12,209,603 B2
(45) Date of Patent: Jan. 28, 2025

(54) FASTENING ELEMENT WITH PARTICLE COATING

(71) Applicant: Hilti Aktiengesellschaft, Schaan (LI)

(72) Inventors: Mareike Frensemeier, Buchs (CH); Jens Kondratiuk, Buchs (CH); Arturo Guevara Arriola, Irving, TX (US)

(73) Assignee: Hilti Aktiengesellschaft, Schaan (LI)

( * ) Notice: Subject to any disclaimer, the term of this patent is extended or adjusted under 35 U.S.C. 154(b) by 998 days.

(21) Appl. No.: 16/754,687

(22) PCT Filed: Nov. 5, 2018

(86) PCT No.: PCT/EP2018/080118
§ 371 (c)(1),
(2) Date: Apr. 8, 2020

(87) PCT Pub. No.: WO2019/096602
PCT Pub. Date: May 23, 2019

(65) Prior Publication Data
US 2020/0256368 A1    Aug. 13, 2020

(30) Foreign Application Priority Data
Nov. 15, 2017 (EP) .................................. 17201846

(51) Int. Cl.
*F16B 33/06* (2006.01)
*F16B 13/06* (2006.01)

(52) U.S. Cl.
CPC ............ *F16B 13/066* (2013.01); *F16B 33/06* (2013.01)

(58) Field of Classification Search
CPC ..................................................... F16B 33/06

USPC ......................................................... 411/914
See application file for complete search history.

(56) References Cited

U.S. PATENT DOCUMENTS

| | | | | |
|---|---|---|---|---|
| 4,545,712 A | * | 10/1985 | Wallace | F16B 39/225 |
| | | | | 470/906 |
| 5,076,733 A | * | 12/1991 | Frease | F16B 13/066 |
| | | | | 405/259.1 |
| 5,176,481 A | | 1/1993 | Schiefer et al. | |
| 5,344,268 A | * | 9/1994 | Fischer | F16B 13/141 |
| | | | | 411/930 |
| 5,690,455 A | * | 11/1997 | Fischer | F16B 13/065 |
| | | | | 411/60.1 |

(Continued)

FOREIGN PATENT DOCUMENTS

| CN | 2541656 Y | 3/2003 |
|---|---|---|
| CN | 101317015 A | 3/2008 |

(Continued)

OTHER PUBLICATIONS

International Search Report of PCT/EP2018/080118, dated Jan. 28, 2019.

*Primary Examiner* — Flemming Saether
(74) *Attorney, Agent, or Firm* — Davidson Kappel LLC

(57) ABSTRACT

A fastening element is provided, in particular an expansion anchor, having a bolt and a retainer arranged on the bolt for introducing tensile forces into the bolt, the bolt having a first metal friction surface and the retaining element having a second metal friction surface, which is associated with the first friction surface. A coating in which particles, preferably hard particles, are embedded is arranged on at least one of the two friction surfaces.

5 Claims, 3 Drawing Sheets

(56) References Cited

U.S. PATENT DOCUMENTS

| | | | |
|---|---|---|---|
| 5,749,605 A * | 5/1998 | Hampton, III | F16L 25/021 |
| | | | 285/333 |
| 8,052,173 B2 | 11/2011 | Carcagno et al. | |
| 9,291,202 B2 | 3/2016 | Von Schleinitz | |
| 9,951,427 B2 | 4/2018 | Horling et al. | |
| 11,015,625 B2 * | 5/2021 | Grimm | F16B 2/005 |
| 2003/0087097 A1 | 5/2003 | Lukschandel et al. | |
| 2004/0096288 A1 * | 5/2004 | Haug | F16B 13/065 |
| | | | 411/57.1 |
| 2008/0050195 A1 * | 2/2008 | Wieser | F16B 13/065 |
| | | | 411/44 |
| 2009/0290953 A1 | 11/2009 | Asai et al. | |
| 2010/0111639 A1 * | 5/2010 | Gaudron | F16B 13/065 |
| | | | 411/354 |
| 2018/0180081 A1 | 6/2018 | Gstach | |
| 2019/0301507 A1 | 10/2019 | Steinberg et al. | |

FOREIGN PATENT DOCUMENTS

| | | |
|---|---|---|
| CN | 101910465 A | 12/2010 |
| CN | 103314058 A | 9/2013 |
| DE | 102010009901 A1 | 9/2011 |
| EP | 0514342 A1 | 11/1992 |
| EP | 1300485 A1 | 4/2003 |
| EP | 1900945 A1 | 3/2008 |
| EP | 3104025 A1 | 12/2016 |
| EP | 3269986 | 1/2018 |
| JP | 57083710 A2 | 5/1982 |
| JP | 2001012432 A | 1/2001 |
| RU | 20555 U1 | 11/2001 |
| RU | 2410574 C1 | 1/2011 |
| WO | WO 2008095216 A2 | 8/2008 |
| WO | WO2018010952 | 1/2018 |

\* cited by examiner

FASTENING ELEMENT WITH PARTICLE COATING

The invention relates to a fastening element, preferably an expansion anchor. A fastening element of this type is equipped with a bolt and a retaining element arranged on the bolt for introducing tensile forces into the bolt, the bolt having a first metal friction surface and the retaining element having a second metal friction surface associated with the first friction surface.

BACKGROUND

EP3104025 A1 and European Patent Application No. 16179695.8 describe expansion anchors for which coatings are provided between the bolts and the expansion body. EP1900945 A1 and JP57083710 A2 disclose screw connectors which are coated in the threaded region.

SUMMARY OF THE INVENTION

The problem addressed by the invention is that of providing a particularly efficient and reliable fastening element which can be manufactured particularly simply.

The present invention provides a bolt and a retaining element arranged on the bolt for introducing tensile forces into the bolt, the bolt having a first metal friction surface and the retaining element having a second metal friction surface which is associated with the first friction surface, characterized in that a coating in which particles are embedded is arranged on at least one of the two friction surfaces.

A fastening element according to the invention is characterized in that a coating in which particles, preferably hard particles, are embedded is arranged on at least one of the two friction surfaces.

A basic concept of the invention can be considered to be that of providing a coating between the two adjacent metal friction surfaces, which coating contains particles, preferably hard particles. As a result, the friction behavior of the two friction surfaces can be modified, which in turn can be advantageous for the efficiency, in particular for the load-bearing capacity, of the fastening element. Thus, for example, undesirable seizure and/or wear can be counteracted in a particularly simple manner, the abrasion resistance can be improved and/or the coefficient of friction can be selectively changed, in particular increased, which can all lead to improved efficiency, in particular load-bearing capacity, in static or dynamic situations. In particular, variable friction behavior can also be provided in a particularly simple manner. For example, the friction behavior can first be determined by the matrix of the coating, in particular at low pressure force, and subsequently by the particles, in particular at high pressure force, which particles can become process-dominant if the coating is loaded accordingly.

The bolt can be understood to mean, in a manner routine in the art, an elongate, rod-like component. The component may have a thread, but it does not have to. The retaining element is suitable for introducing tensile forces, i.e. axially directed, forces, into the bolt, it being possible for said tensile forces to also be constraining forces which can hold the bolt in position, which may be the case in particular if the retaining element, as explained below, is an expansion body that is pressed by the bolt into a perforated wall. The bolt may be made of one part or consist of several separate components.

The two friction surfaces are made of metal, i.e. they are each formed on a metal body. The bolt and the retaining element are thus formed of a metal material at least in the region of the particular friction surface thereof, preferably also completely. On the two friction surfaces, the bolts rub against one another during the intended installation of the fastening element. The two friction surfaces thus form a pair of friction surfaces.

On at least one of the friction surfaces or on both friction surfaces, at least one additional coating may be provided in each case in addition to the coating, for example a corrosion protection layer. In particular, the coating can cover the additional coating, i.e. the additional coating is arranged under the coating on the particular friction surface. In addition to the mentioned particles, the coating can also contain additional particles which have other properties.

The fastening element may preferably be an expansion anchor.

It is particularly preferable that the retaining element is an expansion body, and that the bolt has an expansion region for the expansion body. Accordingly, therefore, the coating according to the invention having particles are provided on the expansion mechanism of an expansion anchor. An application in this region may be advantageous in particular for cyclically loaded expansion anchors. In particular, the expansion region can form a wedge, the expansion body pushes radially outward when the bolt is shifted relative to the expansion body in a pull-out direction. The expansion body may in particular be an expansion sleeve and/or the expansion region may be an expansion cone.

However, the retaining element can also be a nut which is screwed to the bolt. In this case, the two friction surfaces are provided at the screw connection of the nut. As a result, the targeted setting of a pretension can be further improved. If the fastening element is an expansion anchor, a coating according to the invention containing particles can be provided either on the expansion mechanism or on the optionally present nut of the expansion anchor, or also on the expansion mechanism as well as on the nut.

It is particularly preferable that the coating in which particles are embedded is arranged at least on the first friction surface, i.e. on the bolt. This can further simplify production.

It may be sufficient for a coating to be arranged on exactly one of the two friction surfaces in which particles are embedded, which may also be advantageous in terms of the production cost. Said exactly one of the two friction surfaces may in particular be the first friction surface, i.e. the friction surface of the bolt.

In particular, the coating may have a lower hardness than the particles. As a result, multistage friction behavior can be obtained in a particularly simple manner, in which behavior the friction is initially dominated by the coating and, when the load is increased, in particular when pressure and/or abrasion is increased, is dominated by the particles Preferably, the coating may comprise a polymer, in particular a water-based polymer. For example, the polymer may comprise an alkyd resin, a polyester resin and/or an epoxy resin.

It is particularly preferable that the Mohs hardness of the particles is greater than or equal to 6. In particular, when the coating is arranged on an expansion body or on the associated expansion region, a defined increase in friction can be achieved in this case, which can counteract undesired premature pull out of the expansion region from the expansion body in a particularly effective manner. The Mohs hardness of the particles may be less than 10, which may be advantageous, inter alia, in terms of the production cost.

For example, the particles may have a Mohs hardness of 7, an Einlehner abrasiveness of 25 and/or a density of between 2.2 and 2.7 g/cm3. In particular, the particles are hard particles, preferably hard mineral particles. In a manner routine in the art, hard particles can be understood to mean particles having a Mohs hardness above 6.

A further preferred embodiment of the invention is that at least a portion of all particles, in particular a portion of at least 30% or 50% of all particles, is completely enclosed by the coating. Accordingly, at least a portion of all particles is completely buried in the coating and does not appear on the surface of the coating. As a result, a particularly selective multistage friction behavior can be achieved.

It is particularly preferred that the particles have a particle size D50 of between 0.1 µm and 10 µm, preferably of between 0.7 µm and 3.0 µm, in particular of 1.5 µm, and/or that the particles have a particle size D97 of between 0.6 µm and 60 µm, preferably of between 3.0 µm and 12 µm, in particular a particle size of 6.0 µm. In a manner routine in the art, the D-values DXX are intended to specify the size that XX % of the particles do not reach, since they are smaller than the size. Thus, for a D97 of 6 µm, 97% of the particles are smaller than 6 µm.

Furthermore, it has proved to be particularly advantageous for the coating to have a layer thickness of between 0.2 µm and 100 µm, preferably of between 0.5 µm and 25 µm

BRIEF DESCRIPTION OF THE DRAWINGS

The invention is explained in greater detail in the following with reference to preferred embodiments which are shown schematically in the accompanying drawings, it being possible to implement individual features of the embodiments shown in the following in principle individually or in any desired combination within the context of the invention. In the drawings, shown schematically.

DETAILED DESCRIPTION

Figure 1:
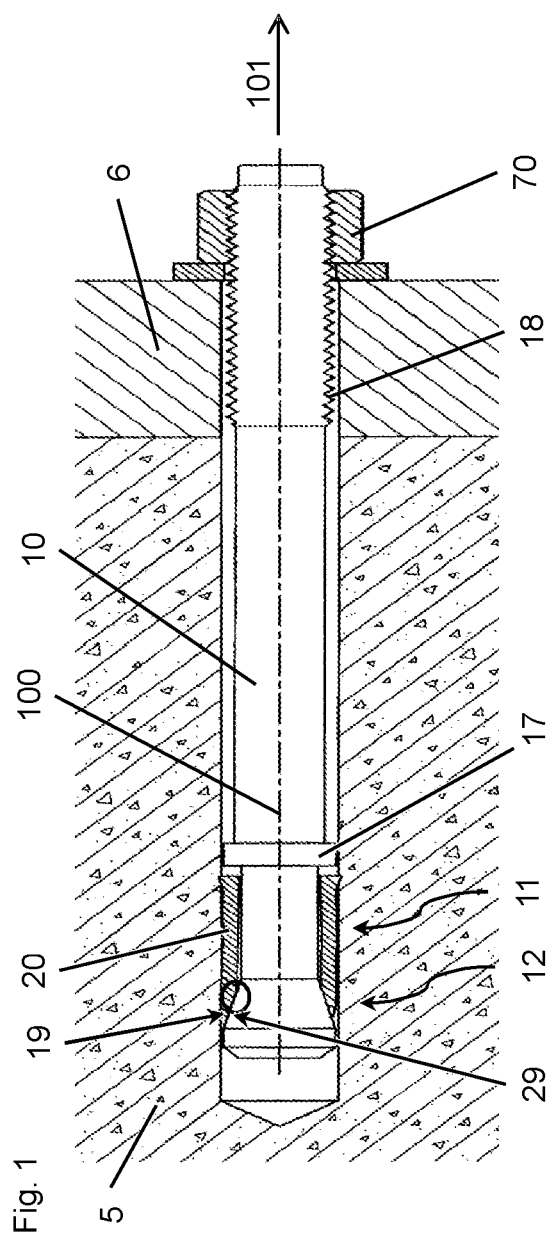
FIG. 1 is a view, partially in longitudinal section, of a fastening element according to a first embodiment, which fastening element is set in a concrete substrate and is designed as an expansion anchor.
Figure 2:
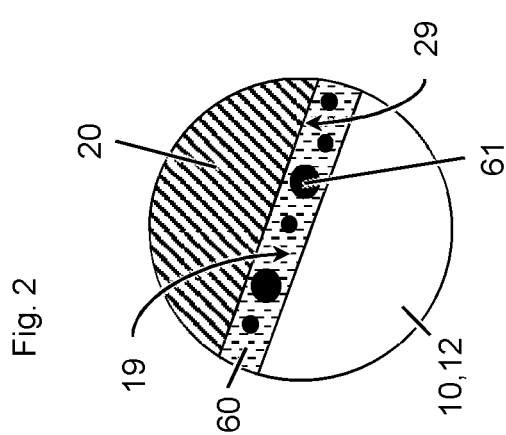
FIG. 2 is a detailed view of the fastening element from FIG. 1 at the point marked by a circle in FIG. 1, at the contact region between the expansion body and the bolt.
Figure 3:
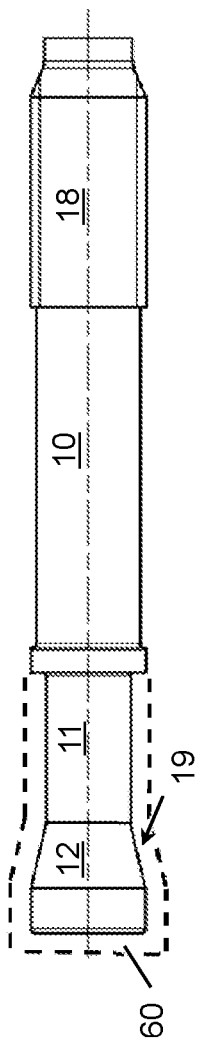
FIG. 3 is a side view of the bolt of the fastening element from FIG. 1.

FIGS. 1 to 3 show a first embodiment of a fastening element according to the invention. As shown in particular in FIG. 1, the fastening element is designed as an expansion anchor and comprises a bolt 10 and an expansion body 20 which is designed as an expansion sleeve and encloses the bolt 10. The bolt 10 has a neck region 11 having a constant cross section and an expansion region 12 for the expansion body 20 following the neck region 11 in the front end region of the bolt 10, at which expansion region the surface of the bolt converges toward the rear, preferably conically. The expansion region 12 forms a wedge, which can push the expansion body 20 radially outward in the event of axial tension in the bolt. On the side of the neck region 11 facing away from the expansion region 12, the bolt 10 has a stop 17, which is designed for example as an annular shoulder, for the expansion body 20. The bolt 10, at the rear end region thereof opposite the expansion region 12, is provided with an external thread 18, to which the bolt 10 is screwed by means of a nut 70.

During installation of the fastening element, the bolt 10 is pushed, with the expansion region 12 at the front, into a borehole in the substrate 5 from FIG. 1, against the pull-out direction 101 parallel to the longitudinal axis 100 of the bolt 10. Due to the stop 17, the expansion body 20 which is designed as an expansion sleeve is also inserted into the borehole. The bolt 10 is then pulled out slightly more from the borehole in the pull-out direction 101 extending parallel to the longitudinal axis 100, for example by tightening the nut 70. The expansion body 20 which is designed as an expansion sleeve remains behind due to the friction thereof against the borehole wall, and the bolt 10 is displaced relative to the expansion body 20. During said displacement, the expansion region 12 of the bolt 10 penetrates ever deeper into the expansion body 20 such that the expansion body 20 is radially expanded by the expansion region 12 and is pressed against the wall of the borehole, as a result of which the fastening element is anchored in the substrate 5. Tensile forces can then be introduced into the bolt 10 by means of the expansion body 20, which tensile forces, as constraining forces, axially retain the bolt 10 in the borehole. The expansion body 20 thus forms a retaining element. The installed state of the fastening element in which said element is anchored in the substrate 5 is shown in FIG. 1. An attachment 6 can be fixed to the substrate 5 by means of the nut 70.

It should be noted that the stop 17 is optional and that, for example, a longer expansion body 20 can be provided which extends up to the borehole mouth and is driven from there into the borehole, for example by means of the nut 70.

The bolt 10 has, in the expansion region 12 thereof, a first friction surface 19 and the expansion body 20 has a second friction surface 29, the expansion body 20 and the bolt 10 rubbing against one another on the two friction surfaces 19 and 29 during installation of the fastening element, in particular when the expansion body 12 is retracted into the expansion body 20.

As can be seen in particular in FIGS. 2 and 3, the first friction surface 19, i.e. the friction surface 19 associated with the bolt 10, comprises a coating 60 in which particles 61 are embedded, and the effect of said coating will be explained in detail below in connection with FIGS. 8 and 9. As FIG. 3 shows, the coating 60 (shown schematically enlarged in FIG. 3 with dashed lines) can also extend beyond the first friction surface 19 into the neck region 11, or otherwise (not shown) extend onto the entire bolt 10, which can simplify production.

Figure 4:
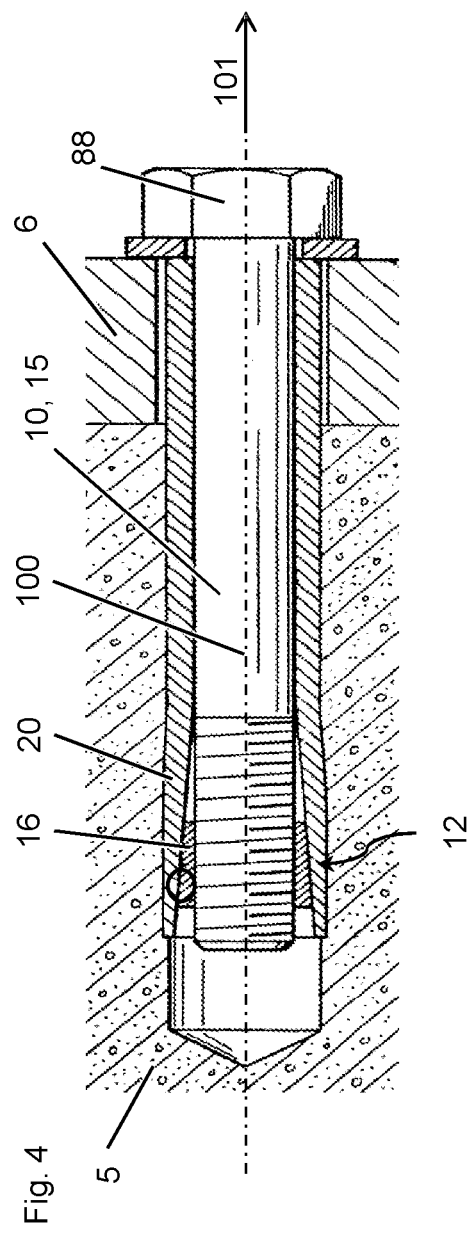
FIG. 4 is a view, partially in longitudinal section, of a fastening element according to a further embodiment, which fastening element is set in a concrete substrate and is designed as an expansion anchor.
Figure 5:
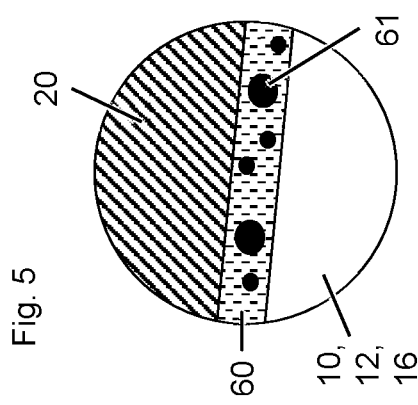
FIG. 5 is a detailed view of the fastening element from FIG. 4 at the point marked by a circle in FIG. 4, at the contact region between the expansion body and the bolt.

Another embodiment of a fastening element is shown in FIGS. 4 and 5. In contrast to the fastening element of FIGS. 1 to 3, in which the bolt is made in one piece and in particular the expansion region 12 of said bolt is fixedly connected to the rest of the bolt 10, the bolt 10 of the embodiment of FIGS. 4 and 5 comprises an anchor rod 15 and a wedge body 16 that is separate from the anchor rod 15, the expansion region 12 for the expansion body 20 being formed on the wedge body 16. The wedge body 16 having the expansion region 12 comprises an internal thread which corresponds to an external thread on the anchor rod 15 of the bolt 10. In addition, in the fastening element of FIGS. 4 and 5, the expansion body 20, which is designed as an expansion sleeve and may also be made of multiple parts, extends up to the borehole mouth, and at the rear end region of the bolt 10 a widened head 88 having an external polygonal structure is preferably non-rotatably mounted on the anchor rod 15.

In order to set the fastening element of FIGS. 4 and 5, the anchor rod 15 is rotated, preferably by means of the head 88, about the longitudinal axis 100. The corresponding threads convert said rotational movement of the anchor rod 15 into an axial movement of the wedge body 16 having the expansion region 12 relative to the anchor rod 15 and thus relative to the expansion body 20, resulting in the retraction of the expansion region 12 into the expansion body 20 and in the anchoring of the fastening element. Once again, the expansion body therefore forms a retaining element by means of which constraining forces in the form of tensile forces can be introduced into the bolt.

Also in the fastening element of FIGS. 4 and 5, the bolt 10, at a first friction surface 19 arranged in the expansion region 12 of said bolt, comprises a coating 60 having particles 61, which coating is opposite a second friction surface 29 formed on the expansion body 20, the expansion body 20 and the bolt 10 rubbing against one another on the two friction surfaces 19 and 29 during installation of the fastening element, in particular when the expansion region 12 is retracted into the expansion body 20. The effect of the coating is explained below in connection with FIGS. 8 and 9.

Figure 6:
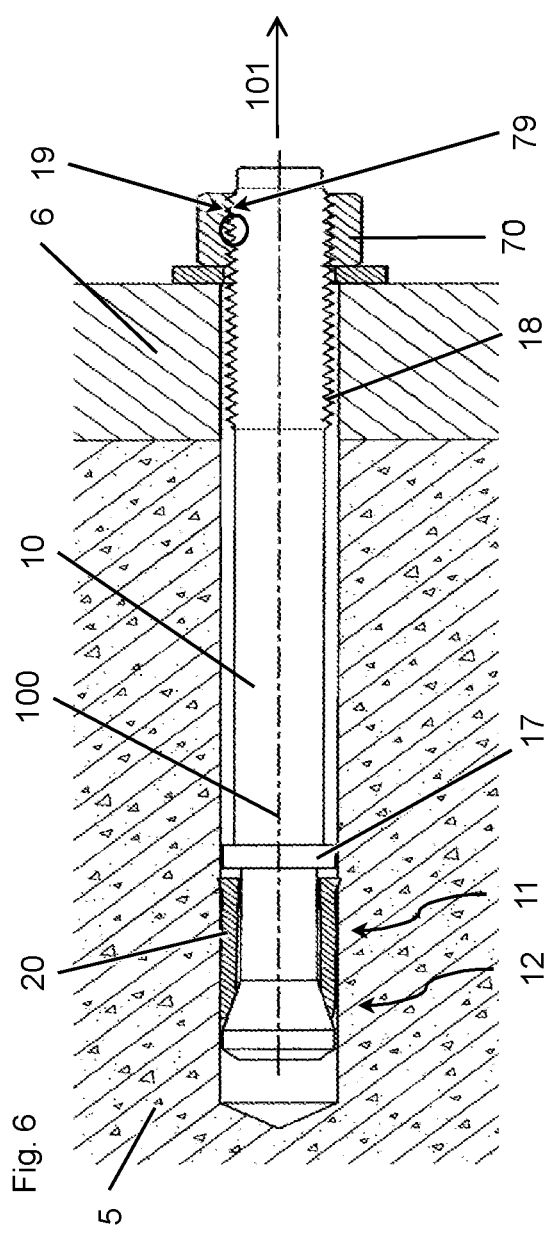
FIG. 6 is a view, partially in longitudinal section, of a fastening element according to a third embodiment, which fastening element is set in a concrete substrate and designed as an expansion anchor.
Figure 7:
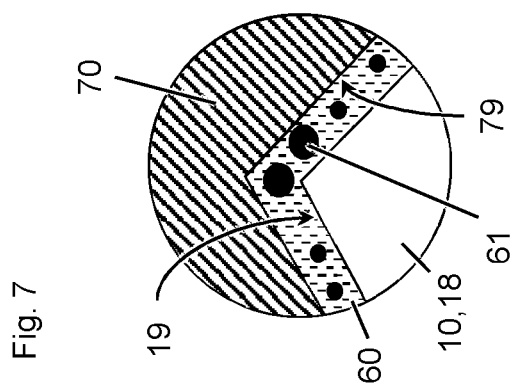
FIG. 7 is a detailed view of the fastening element from FIG. 6 at the point marked by a circle in FIG. 6, at the contact region between the expansion body and the bolt.

FIGS. 6 and 7 show a further embodiment of a fastening element. The fastening element of FIGS. 6 and 7 substantially corresponds to the fastening element of FIGS. 1 to 3, such that reference may be made to the associated description. In contrast to the embodiment of FIGS. 1 to 3, in the embodiment of FIGS. 6 and 7 the second friction surface 79 is on the nut 70 and the first friction surface 19 which corresponds to the second friction surface 79 is on the external thread 18 of the bolt associated with the nut 70. Accordingly, the coating 60 according to the invention having the particles 61 is arranged on the nut 70 or/and on the external thread 18 of the bolt 10. The nut 70 can therefore form a retaining element for introducing tensile force into the bolt 10. The effect of the coating 60 in which particles 61 are embedded is again explained in detail below, in connection with FIGS. 8 and 9.

Embodiments are also conceivable in which a coating according to the invention having particles is located both between the nut and the bolt and between the expansion element and, i.e. in particular a combination of the embodiment in FIGS. 1 to 3 with the embodiment of FIGS. 6 and 7.

Figure 9:
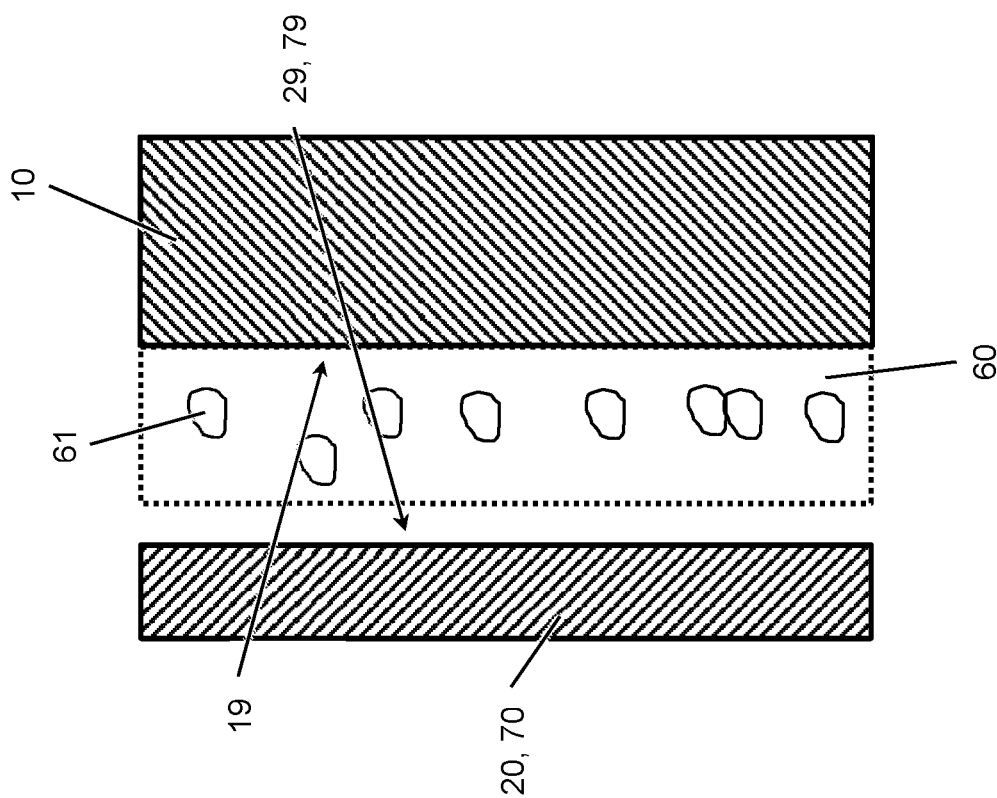
FIGS. 8 and 9 are schematic views of the gap between the two friction surfaces of the aforementioned embodiments, before the friction process in FIG. 8 and during the friction process in FIG. 9.
Figure 8:
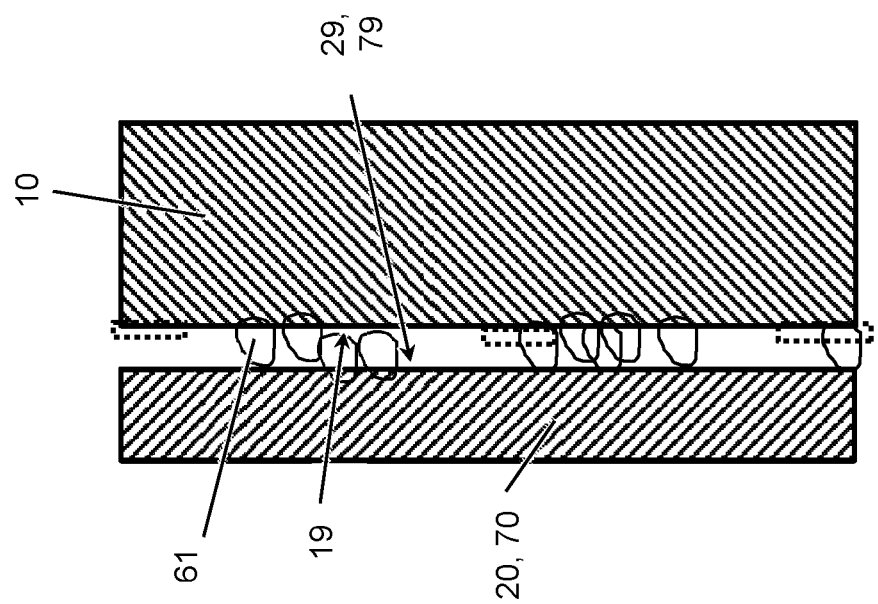

FIGS. 8 and 9 illustrate schematically the mechanism acting on the friction surfaces 19 and 29 or 79 of the aforementioned embodiments. By way of example, the coating 60 here is a relatively soft polymer matrix having a low coefficient of friction, and the particles 61, in contrast, have a significantly higher hardness. At low contact pressures between the friction surfaces 19 and 29, which pressures are present at the beginning of the installation of the fastening element, the friction is determined by the—comparatively low—friction of the polymeric coating 60. At high pressures and/or longer friction distances, which may be present during progressive installation or under particular loads of the fastening element, in particular cyclic loads, the relatively poorly load-bearing coating 60 is removed, destroyed or/and delaminated. However, the comparatively hard and abrasion-resistant particles 61 remain between the friction surfaces 19 on one side and 29 or 79 on the other side, and can henceforth determine the frictional properties. In particular, the particles 61 can effectively counteract seizure and/or cold-welding of the friction surfaces 19 on one side and 29 or 79 on the other side and/or effect a targeted increase in friction under high load, in particular if the particles 61 are relatively hard.

In particular, a colloidal dispersion film can be provided by the introduction according to the invention of hard particles 61 into the coating 60. As the stress increases, the matrix-forming polymeric coating 60 may collapse, the hard particles 61 remaining between the metal friction surfaces 19 on one side and 29 or 79 on the other side, forming a hard separation layer between said friction surfaces.

What is claimed is:

1. A fastening element comprising
   a bolt;
   a retainer arranged on the bolt for introducing tensile forces into the bolt;
   the bolt having a metal first friction surface and the retainer having a metal second friction surface associated with the first friction surface; and
   a coating having embedded particles and arranged on at least one of the first or second friction surfaces;
   the coating having a lower hardness than the particles and at least a portion of all of the embedded particles is completely enclosed by the coating,
   wherein the retainer is a nut screwed to the bolt.

2. A fastening element comprising
   a bolt;
   a retainer arranged on the bolt for introducing tensile forces into the bolt;
   the bolt having a metal first friction surface and the retainer having a metal second friction surface associated with the first friction surface; and
   a coating having embedded particles and arranged on at least one of the first or second friction surfaces;
   the coating having a lower hardness than the particles and at least a portion of all of the embedded particles is completely enclosed by the coating,
   wherein the particles have a particle size D50 between 0.7 µm and 3.0 µm.

3. A fastening element comprising
   a bolt;
   a retainer arranged on the bolt for introducing tensile forces into the bolt;
   the bolt having a metal first friction surface and the retainer having a metal second friction surface associated with the first friction surface; and
   a coating having embedded particles and arranged on at least one of the first or second friction surfaces;
   the coating having a lower hardness than the particles and at least a portion of all of the embedded particles is completely enclosed by the coating,
   wherein the particles have a particle size D50 of 1.5 µm.

4. A fastening element comprising
   a bolt;
   a retainer arranged on the bolt for introducing tensile forces into the bolt;

the bolt having a metal first friction surface and the retainer having a metal second friction surface associated with the first friction surface; and a coating having embedded particles and arranged on at least one of the first or second friction surfaces;

the coating having a lower hardness than the particles and at least a portion of all of the embedded particles is completely enclosed by the coating, wherein the particles have a particle size D97 of 6.0 μm.

5. A fastening element comprising a bolt;

a retainer arranged on the bolt for introducing tensile forces into the bolt;

the bolt having a metal first friction surface and the retainer having a metal second friction surface associated with the first friction surface; and a coating having embedded particles and arranged on at least one of the first or second friction surfaces;

the coating having a lower hardness than the particles and at least a portion of all of the embedded particles is completely enclosed by the coating, wherein the retainer is an expansion body and the bolt has an expansion region for the expansion body, and wherein the embedded particles may have a Mohs hardness of 7, an Einlehner abrasiveness of 25 and a density of between 2.2 and 2.7 g/cm3.

* * * * *